Sept. 2, 1969  B. T. GROBOWSKI  3,464,282
V-BELT DRIVE HAVING SPECIAL GROOVED IDLER PULLEY
Filed June 3, 1968  2 Sheets-Sheet 1
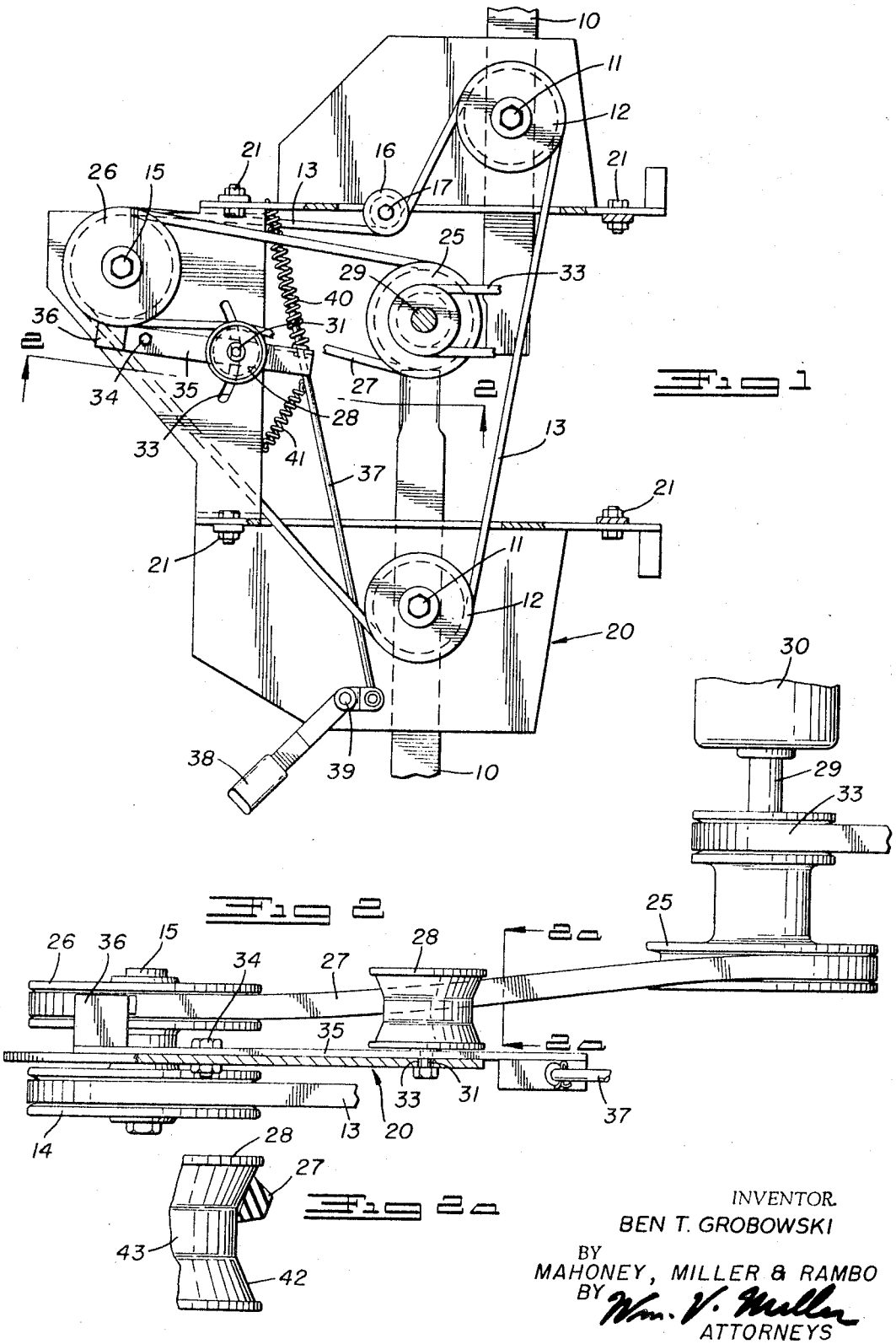
INVENTOR.
BEN T. GROBOWSKI
BY
MAHONEY, MILLER & RAMBO
BY
ATTORNEYS Sept. 2, 1969    B. T. GROBOWSKI    3,464,282
V-BELT DRIVE HAVING SPECIAL GROOVED IDLER PULLEY
Filed June 3, 1968    2 Sheets-Sheet 2
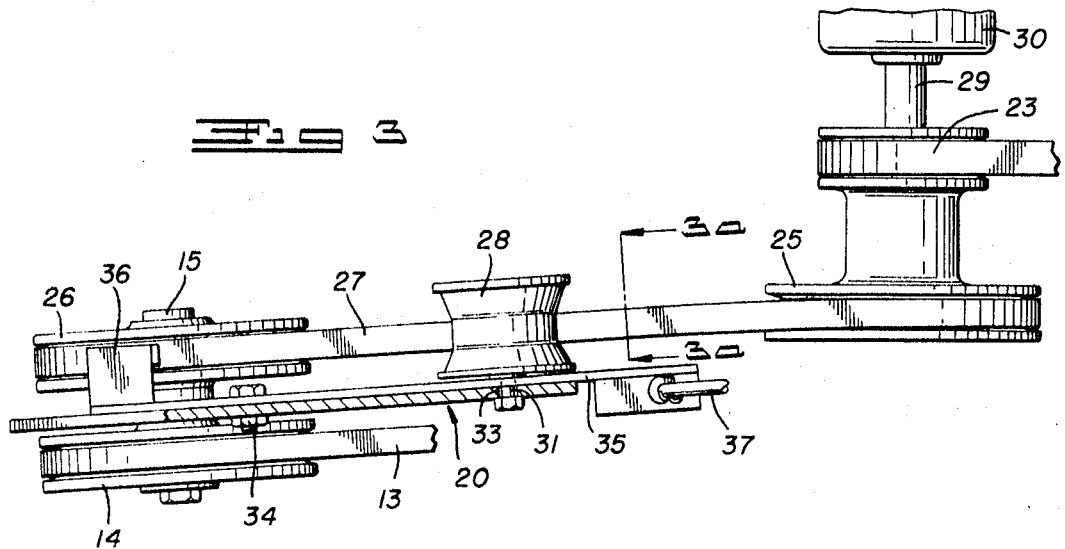
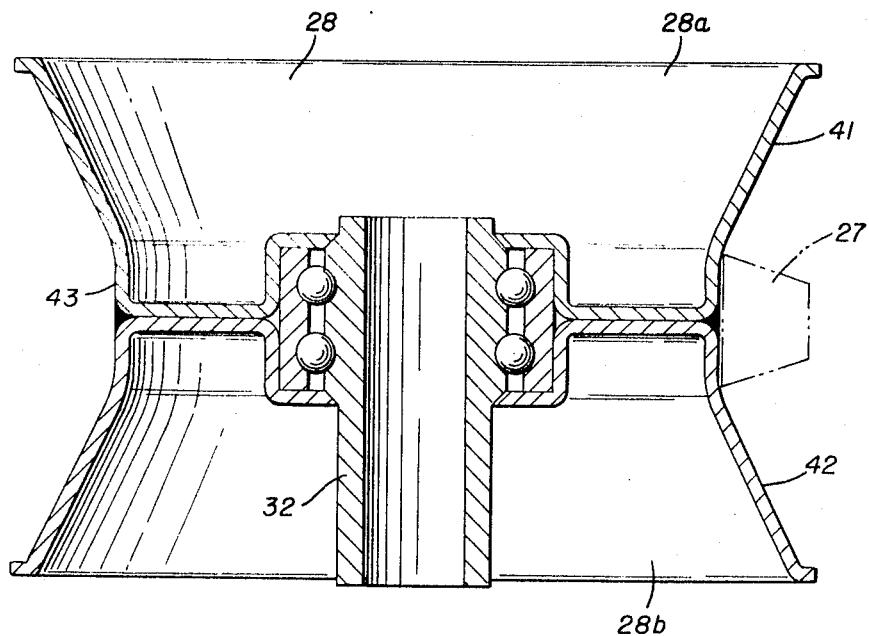
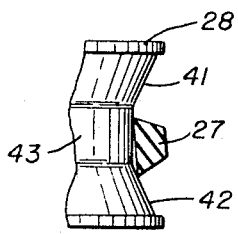
INVENTOR.
BEN T. GROBOWSKI
BY
MAHONEY, MILLER & RAMBO
BY *Wm. V. Miller*
ATTORNEYS

United States Patent Office 3,464,282
Patented Sept. 2, 1969

3,464,282
V-BELT DRIVE HAVING SPECIAL GROOVED IDLER PULLEY
Ben T. Grobowski, Newark, Ohio, assignor to The E. T. Rugg Company, Newark, Ohio, a corporation of Ohio
Filed June 3, 1968, Ser. No. 734—129
Int. Cl. F16h 7/12
U.S. Cl. 74—226                                5 Claims

ABSTRACT OF THE DISCLOSURE

A V-belt drive including a grooved driving pulley and a grooved driven pulley supported on laterally spaced axes and connected by an endless V-belt passing around the pulleys. The V-belt is also engaged by an idler pulley of substantially hourglass cross-sectional form which may be used for obtaining a predetermined tension on the belt, or adjusting that tension.

BACKGROUND OF THE INVENTION

The main object of this invention is to provide a V-belt drive wherein the grooved driving pulley and the grooved driven pulley, carrying the V-belt, can be out of planar alignment without having the V-belt tend to climb out of the groove of the driven pulley. This misalignment of the two pulleys may be the result of relative longitudinal displacement of the axes thereof or relative laterial tilting of the axes thereof, or a combination of both conditions. The tendency for the belt to run out of the driven pulley is overcome, in the preferred embodiment of this invention, by having the run of the belt toward the driven pulley, or the slack side of the belt, engaged on its outer surface by the hourglass-shaped idler pulley and by having the idler pulley supported in the same plane as the driven pulley and on an axis parallel to that of the driven pulley at all times. Then adjustment of the axis of the driven pulley will adjust the axis of the idler pulley and may dispose the idler pulley out of planar alignment with the driving pulley, but the tapered or flared surface of the hourglass idler pulley will guide the belt toward the center of the hourglass groove of the idler pulley and feed it substantially straight into the V-groove of the driven pulley.

In the accompanying drawings, there is illustrated one example of apparatus embodying the V-belt drive arrangement of this invention but it is to be understood that this is by way of illustration only and that the drive is capable of a wide variety of applications.

In these drawings:

FIGURE 1 is a horizontal sectional view showing the belt drive of this invention applied to a mowing unit.

FIGURE 2 is an enlarged vertical sectional view taken along line 2—2 of FIGURE 1 and showing the idler pulley used in the drive with its axis in one position.

FIGURE 2a is an enlarged transverse sectional view taken along line 2a—2a of FIGURE 2.

FIGURE 3 is a view similar to FIGURE 2 but showing the idler pulley with its axis in another position.

FIGURE 3a is an enlarged transverse sectional view taken along line 3a—3a of FIGURE 3.

FIGURE 4 is an enlarged axial view through the idle pulley showing a suitable pulley construction.

With reference to the drawings, the present invention is illustrated as embodied in a V-belt drive for the blades 10 of a rotary mower which are shown as mounted on vertical spindles 11. These spindles also have keyed thereon the grooved pulleys 12 around which the V-belt 13 passes. This belt also passes around a driven grooved pulley 14 which is keyed on a spindle 15. This belt 13 may also be engaged by a small idler pulley 16 carried by a vertical spindle 17. All of the spindles 11, 15 and 17 are suitably carried for rotation on the horizontal plate-like portions of a mower frame 20. This frame, in the usual mower structure, is suitably suspended from a wheeled vehicle (not shown) for translatory movement with the vehicle and for vertical movement thereon, usually for the purpose of permitting vertical floating movement as the vehicle moves along. The means for suspending the frame 20 from the vehicle is not shown in detail but will be attached at the four connections on the frame indicated generally at 21.

The specific mechanism so far described is not important to the present invention but does show one specific example of a use or application of the invention. The drive of this invention is shown as being located above the frame 20 and includes the driving pulley 25, the driven pulley 26, the driving V-belt 27 and the idler pulley 28 associated with the V-belt intermediate the pulleys. The driving pulley 25 is carried by an axially fixed driven shaft or spindle 29 which is shown depending from a vertically fixed housing 30 which, for example, may be a gear or motor housing carried by the vehicle in a fixed vertical position relative to the floating or vertically adjustable frame 20. The unit 30 may drive other parts of the vehicle, such as the wheels, through a pulley and belt 33. The driven pulley 26 is disposed laterally of the driving pulley 25 and may be keyed on the upper portion of the spindle or shaft 15, which also carries the pulley 14 as previously indicated. This spindle 15 and, consequently, the driven pulley 26 are vertically adjustable with the frame 20 which may produce relative misalignment of the driving pulley 25 and the driven pulley 26 because of the relative vertical or axial movement of the axes of the spindles 15 and 29 or the relative tilting thereof. The frame 20 can tilt fore and aft as well as port and starboard at the same time it moves up and down. This indicated relative movement of the spindle axes may result in a simple parallel planar misalignment of the pulleys, or a relative angular misalignment of the planes of the pulleys as is evident from an inspection of FIGURES 2 and 3.

The connecting belt 27 is of the V-type and to produce a predetermined tension on this belt, an adjustable idler pulley usually engages the outer surface of the slack side thereof. According to this present invention, this idler pulley 28 is of special substantially hourglass form, as indicated particularly in FIGURE 4, and this shape, along with its location relative to the pulley 26, overcomes the tendency of the belt 27, when it is twisted due to misalignment of the pulleys, of running out of the groove of the driven pulley 26. Usually it does not tend to come out of the groove of the driving pulley 25 because of driving friction. The axes of the pulleys 28 and 26 are substantially parallel and the centers of the grooves thereof are located substantially in a common plane as indicated in FIGURES 2 and 3.

The pulley 28 is shown rotatably carried by means of a vertical spindle 31 (FIGURE 1) and the mounting on the spindle may be by means of an antifriction bearing, such as a ball bearing 32 indicated in FIGURE 4. The spindle 31 is supported upright by an adjusting and supporting arm 35 which is disposed above the frame 20 and is pivoted thereto at 34 for horizontal oscillating movement. The spindle 31 has its lower end projecting through an arcuate slot 33 in the frame 20 which perimts this adjustment. The adjustment causes the pulley 28 to engage the V-belt 27 outside its run from the driving pulley 25 to the driven pulley 26 or on its slack side. This engagement will be for adjusting the tension on the belt and may function as a clutch for the belt drive. The inner end of the arm 35 may carry an upright brake shoe portion 36 which will swing into engagement with the belt 27 at the pulley 26, when the outer end of the arm 35 is swung outwardly to move the idler pulley 28 out of engagement with the belt.

The oscillating movement of the idler-carrying arm 35 may be accomplished in various ways but the mechanism shown comprises an actuating rod 37 moved by means of a bell crank hand lever 38 pivoted to the frame 20 at 39. A compression spring 40 and a tension spring 41 tend to hold the lever in such a position as to disengage the idler 28 from the belt 27 and must be overcome by actuation of the hand lever 38 to engage the idler with the belt. This spring arrangement will also serve to automatically resiliently engage the brake portion 36 with the belt 27 whenever the idler 28 moves out of engagement with the belt.

The adjustment of the frame 20 relative to the fixed housing or unit 30 will produce conditions indicated in FIGURES 2 and 3 wherein the driving pulley 25 and the driven pulley 26 are misaligned, but since the idler pulleys 28 and the driven pulleys 26 are carried by the same frame 20 their axes will always be parallel with the centers of their respective grooves aligned in a common plane. The adjustment of the frame 20 may produce parallel longitudinal and torsional relative movement of the axes of the pulleys 25 and 26 as shown in FIGURE 2 or relative angular or tilting movement of such axes as indicated in FIGURE 3. In either case, the belt 27 is twisted and if the hourglass-shaped idler 28 is in engagement with the belt so as to drive the pulley 26 from the pulley 25, the inwardly tapering surfaces 41 or 42 will tend to return the belt 27, as shown in FIGURES 2a and 3a, to a desired straight-in path to the driven pulley 26 and thus eliminate the problem of the belt tending to run out of the driven pulley 26 upon pulley misalignment. The pulleys 28 and 26 will always be aligned in a common plane and have their axes parallel, as indicated, but the adjustments indicated above will displace the pulley 28 from the pulley 25 and twist the belt between the pulley 25 and the idler 28. The taper or angle of the surfaces 41 and 42 (FIGURE 4) will vary in accordance with the spacing of the pulleys and the amount of relative adjustment thereof but will be sufficient to always tend to guide the belt into the flat band-like surface 43 at the mid portion of the pulley. This surface 43 is preferably of a width corresponding to the wide side of the V-belt 27 and the width of the groove in the pulley 26. A taper or angle of 30° for each of the surfaces 41 and 42 has been found suitable when the axes of the pulleys 25 and 26 were spaced apart a distance of approximately 5". Although the idler 28 is shown on the slack side of the belt 27, it is possible to use it also on the opposite or tight side of the belt.

The pulley 28 may be formed in various ways but for economy of manufacture is shown as being formed of two half-sections 28a and 28b, which may be produced as stampings, which are welded together as indicated.

It will be understood that the above-indicated idler pulley ararngement in a drive of the type indicated overcomes the problem created by misalignment of the drive and driven pulleys and prevents climbing out of the V-belt from the driven pulley upon twisting of the belt due to that misalignment.

Having thus described this invention, what is claimed is:

1. A power drive of the type indicated comprising a grooved driving pulley and a grooved driven pulley, a V-belt extending around said pulleys, said pulleys being mounted for relative displacement of their axes, and a grooved idler pulley of substantially hourglass shape engaging the V-belt intermediate said pulleys.

2. A power drive according to claim 1 in which said idler pulley is in the same plane and adjustable with one of said pulleys.

3. A power drive according to caim 1 in which the driving pulley is supported by a fixed support with its axis fixed and the axis of the driven pulley is adjustable relative thereto, said idler pulley and said driven pulley being supported with their axes parallel and with the groves in a common plane and carired by a common support for relative adjustment to the driving pulley.

4. A power drive according to claim 3 in which the groove of the hourglass pulley comprises a central flat band area and outwardly tapered straight areas at each side of the flat band area.

5. A power drive according to claim 4 in which the width of the groove in the driven pulley is substantially the same as that of the flat band area of the grove in the idler pulley.

References Cited

UNITED STATES PATENTS

| 2,006,614 | 7/1935 | Wuesthoff | 74—226 XR |
| 2,590,182 | 3/1952 | Kessler et al. | 74—242.1 |
| 3,380,313 | 4/1968 | Bulin | 74—227 |
| 3,413,866 | 12/1968 | Ford | 74—242.11 |

FRED C. MATTERN, Jr., Primary Examiner

J. A. WONG, Assistant Examiner

U.S. Cl. X.R.

74—230.5, 242.1, 242.15